US008879734B2

(12) United States Patent
Ng et al.

(10) Patent No.: US 8,879,734 B2
(45) Date of Patent: Nov. 4, 2014

(54) ENHANCED HIGH AVAILABILITY FOR GROUP VPN IN BROADCAST ENVIRONMENT

(71) Applicant: Juniper Networks, Inc., Sunnyvale, CA (US)

(72) Inventors: Anthony Ng, San Jose, CA (US); Chih-Wei Chao, Saratoga, CA (US); Nagavenkata Suresh Melam, Santa Clara, CA (US); Nilesh Kumar Maheshwari, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/874,053

(22) Filed: Apr. 30, 2013

(65) Prior Publication Data

US 2013/0238794 A1    Sep. 12, 2013

Related U.S. Application Data

(63) Continuation of application No. 12/952,623, filed on Nov. 23, 2010, now Pat. No. 8,442,230.

(51) Int. Cl.
| *H04L 9/00* | (2006.01) |
| *H04L 9/08* | (2006.01) |
| *H04L 12/26* | (2006.01) |
| *H04L 29/06* | (2006.01) |

(52) U.S. Cl.
CPC ............... *H04L 43/10* (2013.01); *H04L 63/065* (2013.01); *H04L 9/0822* (2013.01); *H04L 63/164* (2013.01); *H04L 63/0272* (2013.01)
USPC ............................... 380/260; 726/15; 709/206

(58) Field of Classification Search
CPC ......... H04L 9/18; H04L 9/08; H04L 63/0272; H04L 12/4641; H04L 63/08; H04L 29/08072; H04L 29/06; H04L 43/00
USPC ...................... 380/260; 726/15; 709/206, 224
See application file for complete search history.

(56) References Cited

U.S. PATENT DOCUMENTS

| 7,761,419 B2 | 7/2010 | Wray |
| 8,442,230 B1 | 5/2013 | Ng et al. |
| 2003/0061340 A1* | 3/2003 | Sun et al. ...................... 709/224 |

(Continued)

OTHER PUBLICATIONS

Baugher et al., "The Group Domain of Interpretation", Network Working Group, RFC 3547, Standards Track, Jul. 2003, http://www.ietf.org/rfc/rfc3547.txt, 45 pages.

*Primary Examiner* — Fikremariam A Yalew
(74) *Attorney, Agent, or Firm* — Harrity & Harrity, LLP

(57) ABSTRACT

A light-weight resilient mechanism is used to synchronize server secure keying data with member devices in a highly-scalable distributed group virtual private network (VPN). A server device generates an initial secure keying data set, for the VPN, that includes a first version identifier, and sends, to member devices and via point-to-point messages, the secure keying data set. The server device sends, to the member devices, heartbeat push messages including the first version identifier. The server device generates an updated secure keying data set with a second version identifier and sends, to the member devices, a key push message that includes the updated data set. The server device sends, to the member devices, heartbeat push messages including the second version identifier. Member devices may use the first and second version identifiers to confirm that secure keying data sets are current and quickly identify if updates are missed.

20 Claims, 7 Drawing Sheets

(56) References Cited

U.S. PATENT DOCUMENTS

| | | |
|---|---|---|
| 2006/0123066 A1* | 6/2006 | Jacobs et al. .................. 707/202 |
| 2008/0010371 A1 | 1/2008 | Yamamoto et al. |
| 2009/0187970 A1* | 7/2009 | Mower et al. ..................... 726/3 |
| 2010/0142711 A1 | 6/2010 | Weis et al. |
| 2012/0008506 A1* | 1/2012 | Astigarraga et al. .......... 370/242 |
| 2012/0042084 A1* | 2/2012 | Dutta et al. ................... 709/228 |

* cited by examiner

US 8,879,734 B2

ENHANCED HIGH AVAILABILITY FOR GROUP VPN IN BROADCAST ENVIRONMENT

RELATED APPLICATION

This application is a continuation of U.S. patent application Ser. No. 12/952,623, filed Nov. 23, 2010, now U.S. Pat. No. 8,442,230, which is incorporated herein by reference.

BACKGROUND

A typical VPN (Virtual Private Network) is a network of point-to-point tunnels, where a tunnel is a security association (SA) between two security devices. A security key for the SA is negotiated between two tunnel end devices. Tunnel encapsulation adds an outer header that hides the original source and destination IP addresses. Multicast traffic is replicated and encapsulated before entering into tunnels and treated like unicast traffic within the core network. This architecture is not optimal for multicast traffic, and is not scalable for large deployment.

Group VPNs have been developed that extend current Internet Protocol Security (IPsec) architecture to support group-shared SAs. The center of a group VPN includes a group server, which can be a cluster of servers.

SUMMARY

In one implementation, a method performed by a server device may include receiving, by the server device and from a member device, a registration request for a group virtual private network (VPN); generating, by the server device, an initial secure keying data set, where the secure keying data set includes an initial version identifier; and sending, by the server device and to the member device, the initial secure keying data set with the initial version identifier. The method may further include generating, by the server device, an updated secure keying data set with an updated version identifier; sending, by the server device and to the member device, a key multicast push message including the updated secure keying data set with the updated version identifier; and sending, by the server device and to the member device, one or more heartbeat multicast push messages including the updated version identifier. The method may also include receiving, by the server device and from the member device, another registration request for the group VPN based on detection of a missing key push message or one or more missing heartbeat push messages.

In another implementation, a device may include a memory to store instructions and a processor. The processor may execute instructions in the memory to send, to a member device via a point-to-point message (e.g., upon member device registration), an initial secure keying data set for a group VPN that includes a first version identifier; send, to the member device, one or more heartbeat multicast push messages that include the first version identifier; generate an updated secure keying data set with a second version identifier; send, to the member device, a key multicast push message that includes the updated secure keying data set with the second version identifier; and send, to the member device, one or more heartbeat multicast push messages that include the second version identifier.

In a further implementation, a computer-readable memory having computer-executable instructions may include one or more instructions to generate an initial secure keying data set for a group VPN, where the secure keying data set includes a first version identifier; one or more instructions to send, to member devices of the group VPN via point-to-point messages (e.g., upon member device registration), the secure keying data set with the first version identifier; and one or more instructions to send, to the member devices, one or more heartbeat multicast push messages that include the first version identifier. The instructions may include one or more instructions to generate an updated keying data with a second version identifier; one or more instructions to send, to the member devices, a key multicast push message that includes the updated keying data with the second version identifier; and one or more instructions to send, to the member devices, one or more heartbeat multicast push messages that include the second version identifier.

In still another implementation, a method performed by a member device may include sending, by the member device and to a server device, a registration request for a group VPN; receiving, by the member device and from the server device, an initial secure keying data set, where the initial secure keying data set includes an initial version identifier; and receiving, by the member device and from the server device, a key push message including an updated secure keying data set with an updated version identifier. The method may further include comparing, by the member device, the updated version identifier with the initial version identifier; discarding, by the member device, the updated secure keying data set in the key push message when the updated version identifier has an equal or lower value than the initial version identifier; applying, by the member device, the updated secure keying data set when the updated version identifier is a next increment higher than the initial version identifier; and sending, by the member device and to the group server, another registration request for the group VPN when the updated version identifier is more than one increment higher than the initial version identifier or a generation identifier is different.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Systems and/or methods described herein may provide a mechanism for providing enhanced high availability for members in a group VPN. The systems and/or methods may employ version identifiers for a secure keying data set associated with the group VPN. The version identifiers may be changed each time a group VPN server updates the secure keying data set. The version identifiers may be distributed to the group VPN members with the updated data sets and, also, as part of periodic heartbeat messages. Member devices may compare version identifiers of currently stored data sets with version identifiers in the heartbeat messages to determine, for example, if the member device has a current secure keying data set.

Figure 1:
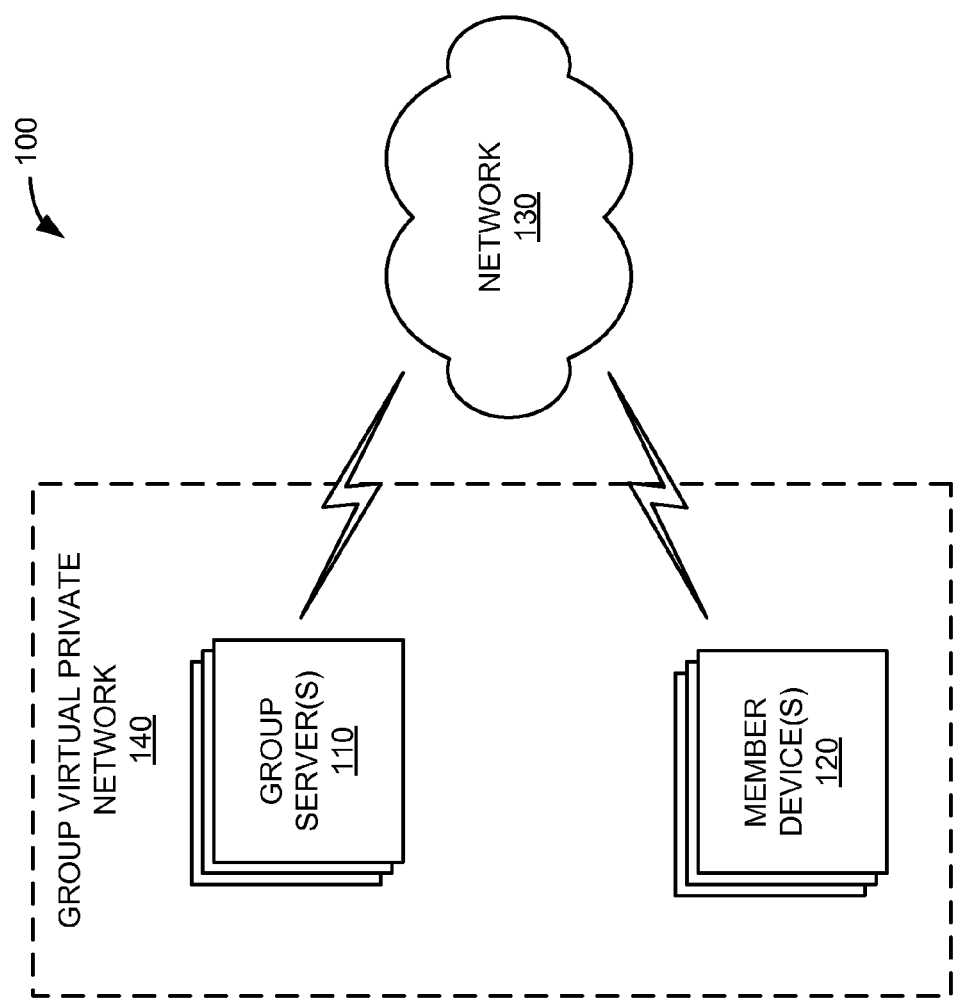
FIG. 1 is a diagram of an example network in which concepts described herein may be implemented.

FIG. 1 is diagram of an example network 100 in which systems and methods described herein may be implemented. Network 100 may include one or more group servers 110 (referred to herein generically and singularly as "group server 110") and one or more member devices 120 (referred to herein generically and singularly as "member device 120") interconnected by a network 130. Group server(s) 110 and member device(s) 120 may connect via wired and/or wireless connections. Group server(s) 110 and member device(s) 120 may be connected within a group virtual private network (VPN) 140.

Group server 110 may include one or more server devices, or other types of computation or communication devices, that gather, process, search, store, and/or provide information in a manner similar to that described herein. For example, group server 110 may host an interface application that may be used to form group VPN 140 with member devices 120. Group server 110 may manage secure keys and policies for group VPN 140. Group server 110 may distribute the secure keys to member devices 120 and may implement procedures to ensure that secure keying updates sent from group server 110 are correctly received by member devices 120. In one implementation, group server 110 may include redundancy support, such that when one group server 110 goes down, a backup group server 110 may continue to provide services for group VPN 140.

Member device 120 may include any device that is capable of communicating with group server 110 and/or another member device 120 via network 130. For example, member device 120 may include a laptop computer, a personal computer, a set-top box (STB), a gaming system, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device (e.g., a wireless telephone), a cellular telephone, a smart phone, other types of mobile communication devices, a global positioning system (GPS) device, a content recording device (e.g., a camera, a video camera, etc.), a vehicular computing and/or communication device, etc. In one implementation, member device 120 may be capable of receiving (e.g., from group server 110) push messages, such as multicast push messages or unicast push messages, that include updates to secure keying data. Member device 120 may also be capable of implementing policies to manage activation and/or confirm relevance of secure keying data. Member devices 120 may be referred to as group VPN members.

Network 130 may include a local area network (LAN), a wide area network (WAN), a metropolitan area network (MAN), a telephone network, such as the Public Switched Telephone Network (PSTN) or a cellular network, the Internet, an intranet, other networks, or a combination of networks.

Group VPN 140 may be implemented using security association protocols that use secure keys to permit communications among multiple group VPN members (e.g., member devices 120) and between group servers 110 and multiple group VPN members (e.g., member devices 120). In one implementation, with some proprietary extension, group VPN 140 may use the Group Domain of Interpretation (GDOI) protocol specified in IETF RFC 3547 to encode messages between server and members. To maintain a secure communications within group VPN 140, the secure keys may be changed (e.g., "re-keyed") occasionally.

In implementations described herein, the re-keying sequence may be accomplished among group server 110 and member devices 120 in a manner that provides reduced risk of disruption to communications within group VPN 140. Group servers 110 and member devices 120 may employ a light-weight resilient mechanism to synchronize secure keying data (e.g., from group server 110) with member devices 120 in a highly-scalable, distributed group VPN (e.g., group VPN 140). Instead of handling individual replies (e.g., ACK messages) from member devices 120, implementations described herein may trigger member devices 120 to re-register with group server 110 when secure keying data is deemed not current or missing. By handling the exceptions (e.g., when member devices 120 identify a missing update), the performance of group server 110 may be improved and network resources may be better utilized while enhancing the availability of VPN 140.

Although FIG. 1 shows example devices of network 100, in other implementations, network 100 may include fewer devices, different devices, differently arranged devices, and/or additional devices than those depicted in FIG. 1. Alternatively, or additionally, one or more devices of network 100 may perform one or more other tasks described as being performed by one or more other devices of network 100. For example, a device may function as both a group server 110 and a member device 120.

Figure 2:
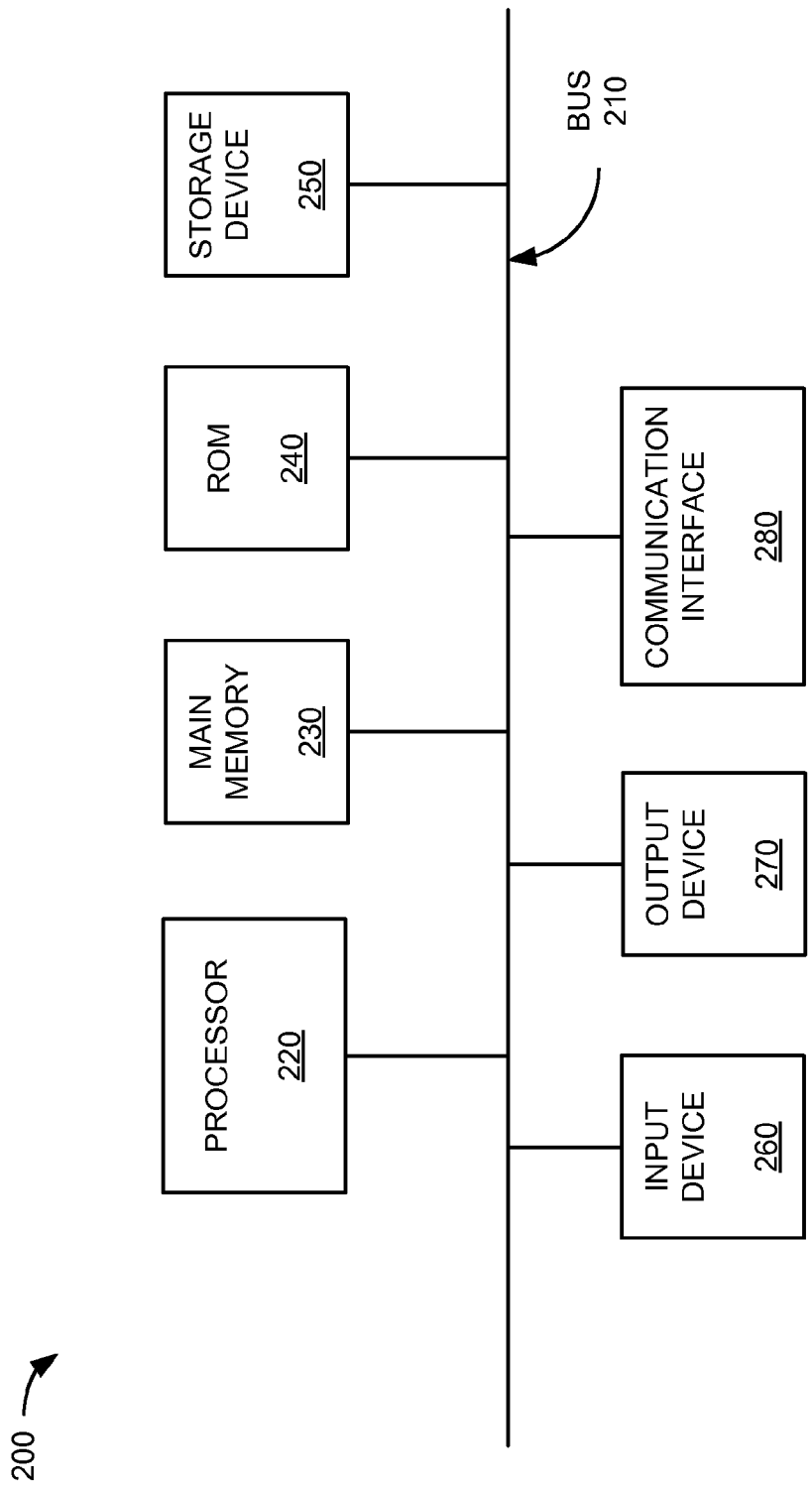
FIG. 2 is a block diagram of an example device of FIG. 1.

FIG. 2 is a block diagram of an example device 200, which may correspond to one of group server 110 and/or member device 120. As shown, device 200 may include a bus 210, a processor 220, a main memory 230, a read only memory (ROM) 240, a storage device 250, an input device 260, an output device 270, and a communication interface 280. Bus 210 may include a path that permits communication among the elements of the device.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to the device, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the device to communicate with other devices and/or systems.

As will be described in detail below, device 200 may perform certain operations relating to time-based secure key synchronization. Network device 200 may perform these operations in response to processor 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as data storage device 250, or from another device via communication interface 280. The software instructions contained in main memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. As an example, in some implementations, input device 260 and/or output device 270 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
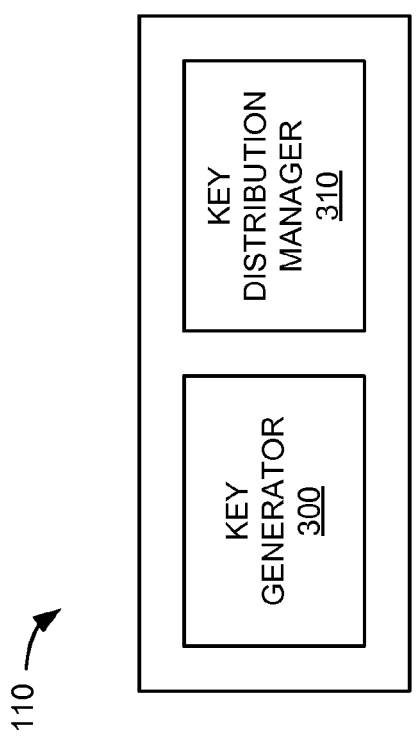
FIG. 3 is a block diagram of example functional components of a group server of FIG. 1.

FIG. 3 is a block diagram of example functional components of group server 110. In one implementation, the functions described in connection with FIG. 3 may be performed by one or more components of device 200 (FIG. 2). As illustrated, group server 110 may include a key generator 300 and a key distribution manager 310.

Group server 110 may distribute two types of secure keys to member devices 120: a key encapsulation key (KEK) and a traffic encapsulation key (TEK). A KEK may be used to protect messages between group server 110 and member devices 120. A TEK may be used to protect messages sent between any two member devices 120. A TEK may also be used to protect multicast/broadcast messages from one member device 120 to many other member devices 120. If a KEK is not used, group server 110 cannot send any new KEKs and/or TEKs (secured by existing KEK) to member devices 120 when the existing ones expire. Group server 110 would then rely on member device 120 to re-register to obtain a new KEK and/or TEK.

Key generator 300 may generate and provide secure keying data (e.g., KEKs, TEKs, and related configuration data) to member devices 120. Key generator 300 may generate secure keying data based on, for example, request/instruction from key distribution manger 310 or another device. Secure keys, such as KEKs and TEKs, may include any type of content that may be used as a key. For example, key generator 300 may provide secure keys that include a sequence of random alpha-numeric characters. Key generator 300 may also provide updates/changes to secure keying data based on, for example, configuration changes, expiration of existing keys, signals from key distribution manger, etc.

The configuration data for the secure keys may include, for example, expiration periods for the secure keys, heartbeat criteria, version identifiers, and/or generation identifiers. Each of the expiration periods for the secure keys, the heartbeat criteria, the version identifiers, and the generation identifiers will now be described. The expiration periods may include a time period that a KEK to TEK is to remain active for group VPN 140.

The heartbeat criteria may include configurable values for periodic signals, referred to as a heartbeat, that may be used to ensure connectivity. Heartbeat criteria may include, for example, an expected signal interval (e.g., every 20 seconds) and a number of consecutive missed heartbeats (e.g., three) that can indicate a connection issue. In one implementation, heartbeat messages may be implemented using a variation of GDOI protocols specified in IETF RFC 3547.

The version identifiers may include version information for a particular secure keying data set. In implementations described herein, each secure keying data set created by key generator 300 may be distinguished by a server key version identifier (SKVID). The SKVID may be applicable to a particular group VPN 140 and may that indicate updates/changes have occurred to a secure keying data set. The SKVID may include a number, time-stamp, alpha-numeric sequence, or another type of indicator that may be used to represent a progression. For example, when the key generator 300 generates an initial keying data set (e.g., KEK, TEK, and configuration data) for a given group VPN 140, the SKVID may be set to "1." After the initial keying data set is created, key generator 300 may increment the SKVID (e.g., to "2," "3," etc.) whenever any piece of data in the initial data set is changed, added, or deleted. A change in the keying data set could be triggered by, for example, a KEK or TEK rekey (e.g., when an existing secure key is close to expiration and new key is generated) and/or configuration changes (e.g., a new policy is added or removed; or some secure parameter, such as a certificate or password, is changed).

The generation identifier may include information to supplement the SKVID. In implementations herein, the generation identifier may be included as part of the SKVID or set apart as a separate identifier. The generation identifier may include a value that is different after each reboot of group server 110. In other words, each generation identifier may be associated with a particular re-boot event of group server 120. Thus, the generation identifier may help member devices 120 to compare a received SKVID with its most recent SKVID during, for example, a re-registration process. For example, if group server 120 resets an SKVID back to 1 after each re-boot, a member device may distinguish between an older SKVID and a new SKVID with the same version number based on the generation identifier.

In one implementation, the generation identifier may be a randomly generated number. In another implementation, the generation identifier may be a number externally stored in some form of permanent storage (e.g., main memory 230 or storage device 250) that is incremented every time that group server 110 reboots. In some implementations, the generation identifier may be an optional element.

In one implementation, updates/changes to secure keying data from key generator 300 may include only new/changed information from the initial secure keying data. Because member devices 120 can detect any missing pushed data from group server 110, key generator 300 may send the difference (or delta) between the expiring secure keying data and the updated secure key data. For example, instead of the complete secure keying data set (e.g., including all policies, corresponding keys, and other data), key generator 300 may include as updates only portions that have been changed. For instance, if there is only one out of many TEKs that are about to expire, un-expired keys and their policies would not have to be included in the updated secure keying data set.

Key distribution manager 310 may distribute secure keying data sets to enable uninterrupted communications between group server 110 and member devices 120 and/or between member devices 120. Key distribution manager 310 may also manage re-transmissions of the secure keying data set. Key distribution manager 310 may distribute initial secure keying data sets to member devices 120 as part of a group VPN registration. For example, key distribution manager 310 may provide initial secure keying data to member device 120 as a point-to-point message (e.g., as a pull reply in response to a pull request from member device 120). Key distribution manager 310 may then provide updates to the secure keying data sets via multicast messages (e.g., KEK-encrypted multicast push messages). Key distribution manager 310 may distribute secure keying data sets, as generated by key generator 300, whenever key generator 300 provides a secure keying data set with a new SKVID. For example, key distribution manager 310 may initiate a TEK and/or KEK re-key sequence for group VPN 140, based on an upcoming expiration time for an existing TEK or KEK. As another example, key distribution manager 310 may provide a secure keying data set based on a configuration change.

Key distribution manager 310 may also provide heartbeat messages (e.g., at configured intervals) that include the SKVID and/or generation identifier for the current (e.g., most recently pushed) secure keying data set. Generally, key distribution manager 310 may initially provide secure keying data sets to member devices 120 using a point-to-point connection (e.g. a pull request/response) as part of a group VPN registration (or re-registration) process. Subsequent updates to the secure keying data sets and/or heartbeats may be simultaneously sent via a multicast push message to multiple member devices 120.

Although FIG. 3 shows example functional components of group server 110, in other implementations, group server 110 may include fewer functional components, different functional components, differently arranged functional components, or additional functional components than depicted in FIG. 3. Alternatively, or additionally, one or more functional components of group server 110 may perform one or more other tasks described as being performed by one or more other components of group server 110.

Figure 4:
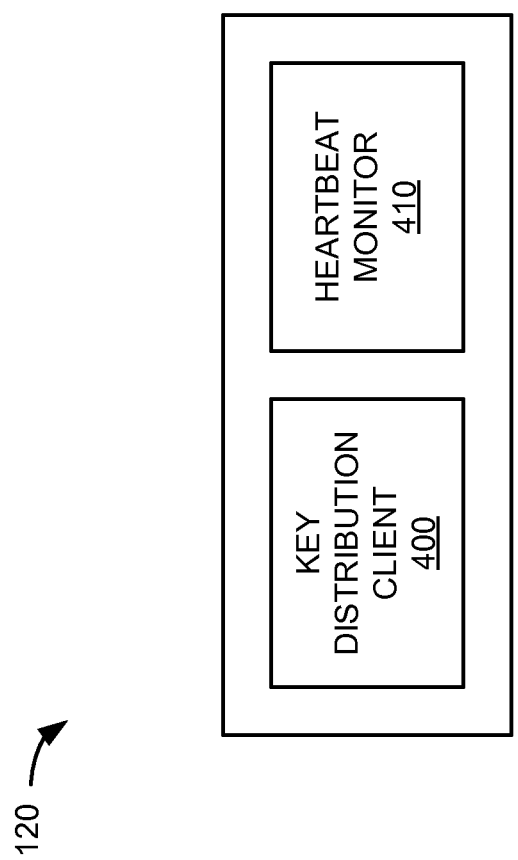
FIG. 4 is a block diagram of example functional components of a member device of FIG. 1.

FIG. 4 is a block diagram of example functional components of a member device 120. In one implementation, the functions described in connection with FIG. 4 may be performed by one or more components of device 200 (FIG. 2). As illustrated, member device 120 may include a push key distribution client 400 and a heartbeat monitor 410.

Key distribution client 400 may manage re-key sequencing for a member device 120. Key distribution client 400 may receive an initial secure keying data set (e.g., with a SKVID and/or generation identifier) from key distribution manager 310 upon registration for group VPN 140. After registration, when receiving a multicast push message (e.g., from key distribution manager 310) with a new secure keying data set, key distribution client 400 may compare the SKVID of the new secure keying data set with the SKVID of the initial (or most recently received) secure keying data set. If the new SKVID is equal to or older than the one key distribution client 400 already has, key distribution client 400 may discard the new secure keying data set, as it may be a retransmission from group server 110 or obsolete data struck in the network (e.g., network 130). If the new SKVID is newer than the one key distribution client 400 already has, key distribution client 400 may cause member device 120 to act on the new secure keying data set. Performing this check of SKVIDs may prove especially useful when the normal behavior is to send multiple copies of the secure keying data set push message (e.g., pushed from group server 110 to member devices 120 in an unacknowledged multicast scenario). The check would not only save resource of member devices 120 to process the message but also make the process more robust.

Heartbeat monitor 410 may monitor heartbeat messages from group server 110. More particularly, heartbeat monitor 410 may monitor the frequency of received heartbeat messages (e.g., based on configuration settings, such as the heartbeat criteria, from group server 110) and the SKVID/generation identifier for each heartbeat message. For example, when heartbeat monitor 410 misses some configurable number of heartbeats, heartbeat monitor 410 may cause member device 120 to re-register with group server 110 to get a copy of the latest secure keying data set. When heartbeat monitor 410 receives a heartbeat message from group server 110, heartbeat monitor 410 may also compare the SKVID number in the heartbeat message with the most recent SKVID (e.g., from the most recent secure keying data set). If the SKVID in the heartbeat message is of higher (e.g., more recent) value, heartbeat monitor 410 may determine that the member device 120 has missed a push update from group server 110. Heartbeat monitor 410 may then trigger a re-registration to get the latest data set from group server 110. In all cases, member devices 120 will not need to reply (e.g., via an ACK message) to the heartbeat message received from group server 110. Thus, accuracy/currency of secure keying data sets may be monitored while reducing the load on group server 110.

Although FIG. 4 shows example functional components of member device 120, in other implementations, member device 120 may include fewer functional components, different functional components, differently arranged functional components, or additional functional components than depicted in FIG. 4. Alternatively, or additionally, one or more functional components of member device 120 may perform one or more other tasks described as being performed by one or more other components of member device 120.

Figure 5:
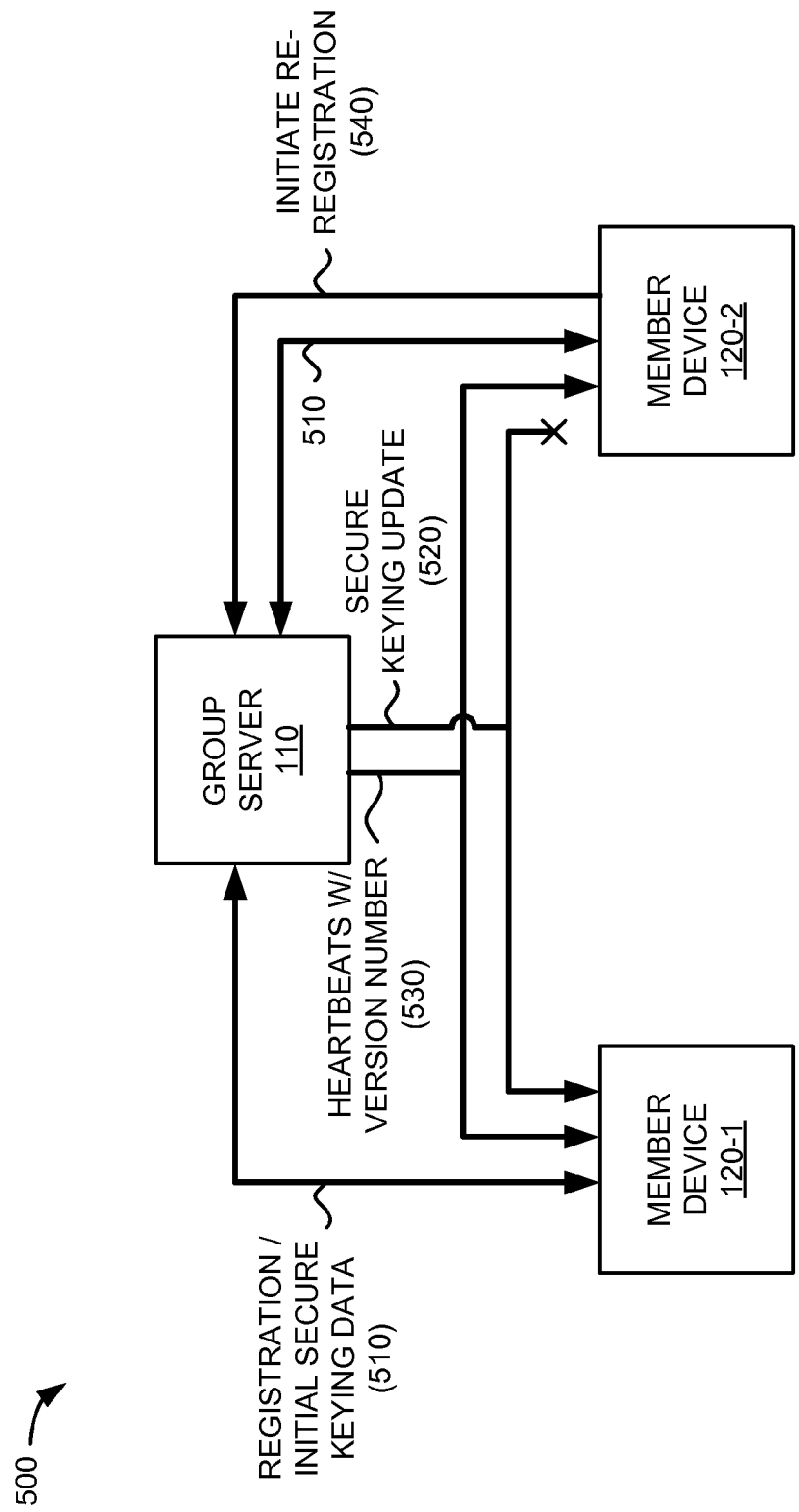
FIG. 5 is a diagram of example interactions among components of an example portion of the network illustrated in FIG. 1.

FIG. 5 is a diagram of example interactions among components of an example portion 500 of network 100. As illustrated, example network portion 500 may include group server 110 and two member devices 120 (referred to individually in FIG. 5 as member device 120-1 and member device 120-2). Group server 110 and member devices 120 may include the features described above in connection with, for example, FIGS. 1-4.

As further shown in FIG. 5, member device 120-1 and member device 120-2 may each conduct a separate registration process (e.g., to register as part of group VPN 140) with group server 110, as indicated by reference numbers 510. As part of the registration process, group server 110 may receive an initial pull request from each member device 120-1 and 120-2 and separately provide initial secure keying data (e.g., a KEK, TEKs with configuration data) to each member device 120-1 and 120-2. In implementations described herein, the initial secure keying data set may include a version identifier (e.g., a SKVID) and, optionally, a generation identifier for the secure keying data set.

After the initial registration process between group server 110 and member devices 120, group server 110 may provide a secure keying update 520 for the secure keying data set using push messages (e.g., multicast push messages to all member devices 120 of group VPN 140, including each of member devices 120-1 and 120-2). Securing keying update 520 may include an updated secure keying data set with a different version identifier (e.g., SKVID) and/or a different generation identifier. Assume, as shown in FIG. 5, that member device 120-1 successfully receives secure keying update 520 and that member device 120-2 does not receive secure keying update 520.

Group server 110 may also provide heartbeats 530 to member devices 120 using, for example, multicast push messages. For example, in one implementation, member devices 120 may not be required to acknowledge receipt of heartbeats 530. Heartbeats 530 may be KEK-encrypted and may include a SKVID that corresponds to the most recent secure keying data set provided by group server 110 (e.g., the same SKVID as provided in secure keying update 520). In one implementation, heartbeats 530 may also include a generation identifier. Assume, as shown in FIG. 5, that member device 120-2 successfully receives heartbeat 530 and that member device 120-1 does not receive heartbeats 530.

In the example of FIG. 5, member device 120-1 may receive secure keying update 520 and compare the SKVID in secure keying update 520 with the SKVID from the initial secure keying data set. Since the SKVID in secure keying update 520 will have a higher value than the SKVID from the initial secure keying data set, member device 120-1 may act on the information in secure keying update 520. If, as shown in FIG. 5, member device 120-1 receives heartbeats 530 after receiving secure keying update 520, heartbeats 530 received by member device 120-1 will have the same SKVID as the SKVID stored in member device 120-1 (e.g., the SKVID from secure keying update 520). As long as the SKVID in heartbeats 530 matches (or is lower than) the SKVID stored in member device 120-1, member device 120-1 may take no action based on heartbeats 530.

Because, in the example of FIG. 5, member device 120-2 did not receive secure keying update 520, heartbeats 530 received by member device 120-2 will have a different (e.g., higher) SKVID than the SKVID stored in member device 120-2 (e.g., the SKVID from the initial secure keying data set). Member device 120-2 may receive one of heartbeats 530 and may compare the SKVID in heartbeat 530 with the SKVID from the initial secure keying data set. Since the SKVID in heartbeats 530 will have a higher value than the SKVID from the initial secure keying data set, member device 120-2 may initiate re-registration 540 with group server 110 to obtain the current secure keying data set from group server 110 (e.g., via a pull request/response). Similarly, if member device 120-2 fails to receive heartbeat message for a consecutive number of intervals (not shown), member device 120-2 may also initiate re-registration 540 with group server 110 to obtain the current secure keying data set from group server 110.

Although FIG. 5 shows example components of network portion 500, in other implementations, network portion 500 may include fewer components, different components, differently arranged components, and/or additional components than depicted in FIG. 5. Alternatively, or additionally, one or more components of network portion 500 may perform one or more other tasks described as being performed by one or more other components of network portion 500.

Figure 6:
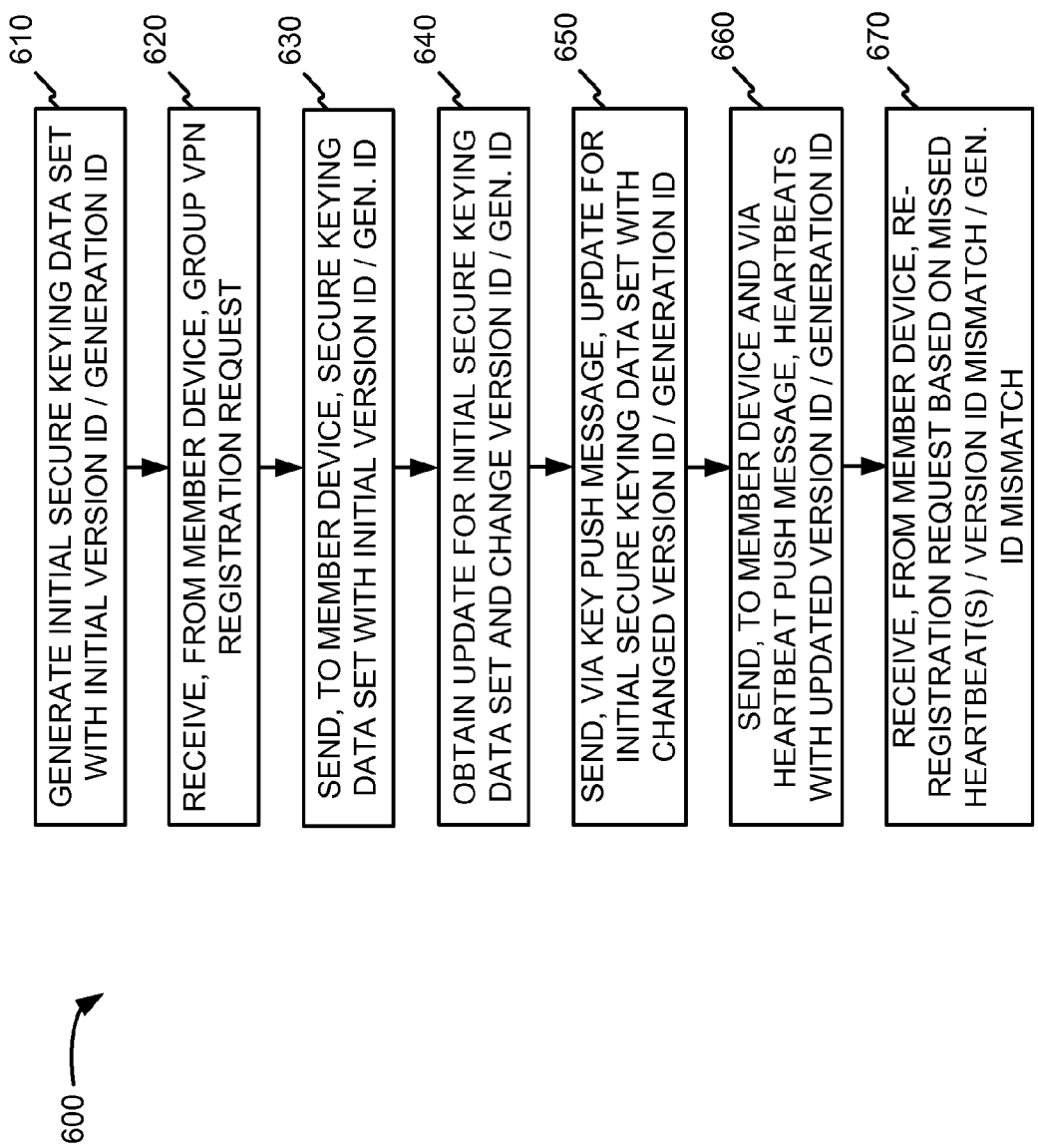
FIG. 6 is a flow diagram illustrating an example process for providing securing keying updates to a member device according to an implementation described herein.

FIG. 6 is a flow diagram illustrating an example process 600 for providing secure keying updates to a member device according to an implementation described herein. In one implementation, process 600 may be performed by group server 110. In another implementation, process 600 may be performed by another device or group of devices including or excluding group server 110.

Process 600 may include generating an initial secure keying data set with an initial version identifier (ID) and/or generation identifier (block 610), receiving, from a member device, a group VPN registration request (block 620), and sending, to the member device, the initial secure keying data set with the initial version identifier and/or generation identifier (block 630). For example, as referring to communications in FIG. 5, member device 120 may conduct a registration process (e.g., to register as part of group VPN 140) with group server 110, as indicated by reference numbers 510. As part of the registration process, group server 110 may receive an initial pull request from member device 120 and may separately provide initial secure keying data (e.g., a KEK, TEKs with configuration data) to member device 120. In implementations described herein, the initial secure keying data set may include a version identifier (e.g., a SKVID) and, optionally, a generation identifier for the secure keying data set. The SKVID may be applicable to a particular group VPN 140 and may that indicate updates/changes have occurred to a secure keying data set.

Process 600 may further include obtaining an update for the initial secure keying data set and changing the version identifier and/or the generation identifier (block 640), and sending, via a key push message, the update for the initial secure keying data set with the changed version identifier and/or the generation identifier (block 650). For example, group server 110 (e.g., key generator 300) may also provide updates/changes to a secure keying data set based on, for example, configuration changes, expiration of existing keys, signals from key distribution manger 310 or another device, etc. Configuration data for the updated secure keying data set may include a version identifier and/or generation identifier. Group server 110 (e.g., key distribution manager 310) may provide the updates to the secure keying data sets (e.g., secure keying update 520 of FIG. 5) via a key push message (e.g., KEK-encrypted multicast push messages). Key distribution manager 310 may distribute updated secure keying data sets, as generated by key generator 300, whenever key generator 300 provides a secure keying data set with a new SKVID.

Heartbeats with the updated version identifier and/or generation identifier may be sent via a heartbeat push message (block 660) and a re-registration request, from the member device, may be received based on one or more of missed heartbeats, a version identifier mismatch or a generation identifier mismatch (block 670). For example, group server 110 (e.g., key distribution manager 310) may provide heartbeat messages (e.g., at configured intervals) that include the SKVID and/or generation identifier for the current (e.g., most recently pushed) secure keying data set. Heartbeat messages (e.g., heartbeats 530 of FIG. 5) may be simultaneously sent via a heartbeat multicast push message to multiple member devices 120. Member devices 120 may receive secure keying update 520 and/or heartbeats 530. If the generation identifier in secure keying update 520 or the SKVID in heartbeats 530 have a different/higher value than the generation identifier or SKVID from the initial secure keying data set, member device 120 may initiate re-registration 540 with group server 110 to obtain the current secure keying data set from group server 110 (e.g., via a pull request/response). Similarly, if a member device 120 fails to receive heartbeats signal for a particular consecutive number of intervals, member device 120 may also initiate re-registration 540 with group server 110 to obtain the current secure keying data set from group server 110.

Figure 7:
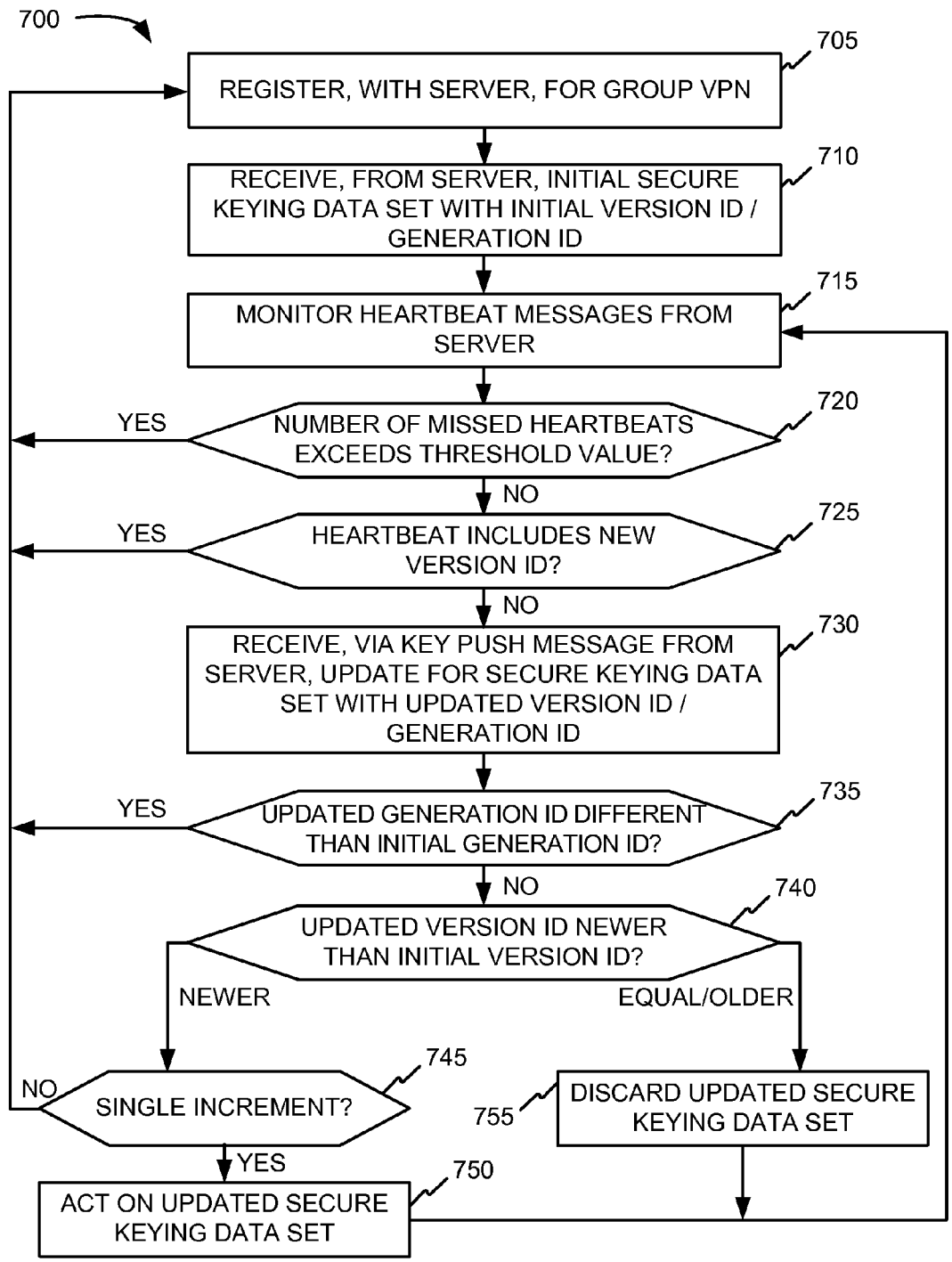
FIG. 7 is a flow diagram illustrating an example process for enacting secure keying updates from a server according to another implementation described herein.

FIG. 7 is a flow diagram illustrating an example process 700 for enacting secure keying updates from a server according to an implementation described herein. In one implementation, process 700 may be performed by member device 120. In another implementation, process 700 may be performed by another device or group of devices including or excluding member device 120.

Process 700 may include registering with a server for a group VPN (block 705), and receiving, from the server, an initial secure keying data set with an initial version identifier (ID) and/or generation identifier (block 710). For example, member device 120 (e.g., key distribution client 400) may receive an initial secure keying data set (e.g., with a SKVID and/or generation identifier) from group server 110 (e.g., key distribution manager 310) upon registration for group VPN 140.

Process 700 may include monitoring heartbeat messages from the server (block 715), and determining if a number of missed heartbeats exceeds a threshold value (block 720). For example, member device 120 (e.g., heartbeat monitor 410) may monitor heartbeat messages from group server 110. More particularly, heartbeat monitor 410 may monitor the frequency of received heartbeat messages (e.g., based on configuration settings, such as the heartbeat criteria, from group server 110). Heartbeat criteria may include, for example, an expected signal interval (e.g., every 20 seconds) and a number of consecutive missed heartbeats (e.g., three) that can indicate a connection problem.

If the monitoring results in detection of a number of missed heartbeats over a threshold value (block 720—YES), process 700 may return to block 705 to register with the server. When a new secure keying data set from group server 110 is received (e.g., based on the registration initiated due to the missed heartbeats), member device 120 may compare its current SKVID/generation identifier with that in the newly received data. If they are the same, member device 120 may determine that member device 120 may has missed some heartbeats but that the secure keying data set from group server 120 has not been changed. In this case, member 120 may simply drop the new secure keying data set. Otherwise, it will smoothly transition to use the new secure keying set data.

If the monitoring does not result in detection of a number of missed heartbeats over a threshold value (block 720—NO), it may be determined if one of the heartbeats includes a new version identifier (block 725). For example, when member device 120 (e.g., heartbeat monitor 410) misses some configurable number of heartbeats, heartbeat monitor 410 may cause member device 120 to re-register with group server 110 to get a copy of the latest secure keying data set. When heartbeat monitor 410 receives a heartbeat message from group server 110, heartbeat monitor 410 may compare the SKVID number in the heartbeat message with the most recent SKVID (e.g., from the most recent secure keying data set).

If one of the heartbeats includes a new version identifier (block 725—YES), process 700 may return to block 705 to register with the server. If none of the heartbeats includes a new version identifier (block 725—NO), process 700 may include receiving, via a key push message from the server, an update for the secure keying data set with an updated version identifier and/or generation identifier (block 730). For example, if the SKVID in the heartbeat is of higher (e.g., newer) value, member device 120 (e.g., heartbeat monitor 410) may determine that the member device 120 has missed a push update from group server 110. Member device 120 may then trigger a re-registration to get the latest secure keying data set from group server 110. Member device 120 (e.g., key distribution client 400) may receive a key multicast push message (e.g., from key distribution manager 310 of group sever 110) with a new secure keying data set. The new secure keying data set may include new SKVID and/or generation ID corresponding to the new secure keying data set.

If the updated generation identifier is different than the initial generation identifier (block 735—YES), process 700 may return to block 705 to register with the server. If the updated generation identifier is not different than the initial generation identifier (block 735—NO), it may be determined if the updated version identifier is newer than the initial version identifier (block 740). For example, if the generation identifier is included as part of the SKVID, member device 120 (e.g., key distribution client 400) may compare the generation identifier portion of the SKVID of the new secure keying data set with the generation identifier portion of the SKVID of the initial (or most recently received) secure keying data set. If the generation identifier is included as a separate identifier in the secure keying data set, member device 120 may compare the separate generation identifier of the new secure keying data set with the separate generation identifier of the initial (or most recently received) secure keying data set. If the new generation identifier and the initial generation identifier are different, member device 120 may recognize that a reboot of group server 110 has occurred and re-register with group server 110. Otherwise, member device 110 may examine the SKVID (e.g., the version identifier portion). Under normal circumstances, the generation identifier received in the key push message and the heartbeat push message (protected by a KEK) will not be different from the values stored in member device 120. This is because the key push message and heartbeat push message are protected by a KEK. If group server 120 reboots, a new KEK may be generated in addition to the new generation identifier. When the new KEK is used, member devices 120 would not be able to decode the key push message and/or heartbeat push message received from the rebooted group server 110 until member 120 re-registers with group server 110.

If the updated version identifier is newer than the initial version identifier (block 740—NEWER), it may be determined if the newer version identifier is higher by a single increment (block 745). If the newer version identifier is not higher by a single increment (block 745—NO), process 700 may return to block 705 to register with the server. If the newer version identifier is higher by a single increment (block 745—YES), process 700 may include acting on the updated secure keying set (block 750). If the updated version identifier is not newer than the initial version identifier (block 740—EQUAL/OLDER), process 700 may include discarding the updated secure keying set (block 755).

For example, if the new SKVID is one increment higher than the SKVID that key distribution client 400 already has, key distribution client 400 may cause member device 120 to act on the new secure keying data set. If the new SKVID is more than one increment higher, key distribution client 400, recognizing that a previous secure keying data set update has been missed, may re-register with group server 110. If the new SKVID is equal to or older than the one member device 120 already has, member device 120 may discard the new secure keying data set, as it may be a retransmission from group server 110 or obsolete data struck in the network (e.g., network 130).

In the systems and/or methods described herein, a server device may generate an initial secure keying data set for a group VPN, where the secure keying data set includes a first version identifier, and may send, to member devices of the group VPN and via multiple point-to-point messages, the secure keying data set with the first version identifier. The server device may later send, to the member devices, one or more heartbeat multicast push messages that include the first version identifier. The server device may later generate an updated secure keying data set with a second version identifier and may send, to the member devices, a key multicast push message that includes the updated secure keying data set with the second version identifier. The server device may then send, to the member devices, one or more heartbeat multicast push messages that include the second version identifier.

The systems and/or methods described herein may provide an easily scalable secure key synchronization mechanism. In a large network with multicast support, updated keying data and heartbeats with version identifiers may be efficiently multicast to all group VPN members, potentially a configurable number of times, without the need for acknowledgements from each member device. Thus, the systems and/or methods may significantly reduce the load on the group server to handle all individual replies from member devices and schedule retransmissions.

The systems and/or methods may enhance availability of the group VPN support by providing resilience against missing new secure keying data when there is network disruption between server and members. A member may detect that it missed newly changed keying data from the server, and trigger re-registration to the server to get the latest keys/data. Also, members may detect that the server may have rebooted, and, thus, the members would need to re-register to the server to get the newly generated keys/data from the recovered server. Furthermore, instead of sending a complete keying data set with each update, the server may preserve network resources by pushing only the difference (or delta) between past secure keying data and updated secure key data.

The foregoing description of example implementations provides illustration and description, but is not intended to be exhaustive or to limit the invention to the precise form disclosed. Modifications and variations are possible in light of the above teachings or may be acquired from practice of the invention.

For example, while implementations are described herein primarily in the context of multicast push messages, in other implementations, the system and/or methods described herein may be applied with unicast push messages to allow member devices, for example, to promptly detect a server reboot.

In another example, implementation may not include a generation identifier. If, for example, a member device may be configured to compare an SKVID number only when it receives pushed data or heartbeats from the group server, and/or ignore the SKVID number when it re-registers to the group server and compare its complete secure keying data received. Under such conditions, use of a generation number may be optional, as pushed server data and heartbeats from a newly rebooted server would not be decrypted by members which have not re-registered to the server (since server's reboot) and employed an old KEK key.

As a further example, while series of blocks have been described with respect to FIGS. 6 and 7, the order of the blocks may be varied in other implementations. Moreover, non-dependent blocks may be implemented in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as a "component" that performs one or more functions. This component may include hardware, such as a processor, microprocessor, an application specific integrated circuit, or a field programmable gate array; or a combination of hardware and software.

It should be emphasized that the term "comprises" and/or "comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
   receiving, by a device and from a server device, an initial data set,
   the initial data set including a first version identifier;
   monitoring, by the device, heartbeat messages received from the server device;
   determining, by the device and based on monitoring the heartbeat messages, a number of missed heartbeat messages;
   determining, by the device, if the number of missed heartbeat messages exceeds a threshold value;
   determining, by the device and when the number of missed heartbeat messages does not exceed the threshold value, if at least one of the heartbeat messages includes a second version identifier,
   the first version identifier being different than the second version identifier;
   receiving, by the device and when the at least one of the heartbeat messages does not include a second version identifier, an updated data set,
   the updated data set including an updated version identifier;
   determining, the device and when the updated version identifier is newer than the first version identifier, if the updated version identifier is a particular increment higher than the first version identifier;
   discarding, by the device and when the updated version identifier is not newer than the first version identifier, the updated data set; and
   transmitting, by the device and when the updated data set is different than the initial data set, a registration request to the server device.

2. The method of claim 1, further comprising:
   processing, when the updated version identifier is the particular increment higher than the first version identifier, the updated data set.

3. The method of claim 1, further comprising:
   transmitting, when the updated version identifier is not the particular increment higher than the first version identifier, another registration request to the server device.

4. The method of claim 1, further comprising:
   transmitting, when the number of missed heartbeat messages exceeds the threshold value, another registration request to the server device.

5. The method of claim 1, further comprising:
transmitting, when the at least one of the heartbeat messages includes the second version identifier, another registration request to the server device.

6. A device comprising:
a memory to store a plurality of instructions; and
a processor to execute the plurality of instructions in the memory to:
receive, from a server device, an initial data set,
the initial data set including a first version identifier;
monitor heartbeat messages received from the server device;
determine, based on monitoring the heartbeat messages, a number of missed heartbeat messages;
determine if the number of missed heartbeat messages exceeds a threshold value;
determine, when the number of missed heartbeat messages does not exceed the threshold value, if at least one of the heartbeat messages includes a second version identifier,
the first version identifier being different than the second version identifier;
receive, when the at least one of the heartbeat messages does not include a second version identifier, an updated data set,
the updated data set including an updated version identifier;
determine, when the updated version identifier is newer than the first version identifier, if the updated version identifier is a particular increment higher than the first version identifier;
discard when the update version identifier is not newer than the first version identifier, the updated data set; and
transmit, when the updated data set is different than the initial data set, a registration request to the server device.

7. The device of claim 6, where the processor is further to:
process, when the updated version identifier is the particular increment higher than the first version identifier, the updated data set.

8. The device of claim 6, where the processor is further to:
transmit, when the updated version identifier is not the particular increment higher than the first version identifier, another registration request to the server device.

9. The device of claim 6, where the processor is further to:
transmit, when the number of missed heartbeat messages exceeds the threshold value, another registration request to the server device.

10. The device of claim 6, where the processor is further to:
transmit, when the at least one of the heartbeat messages includes the second version identifier, another registration request to the server device.

11. The device of claim 6, where the particular increment is a single increment.

12. The device of claim 6, where the processor is further to:
register, with the server device, for a group network,
where the processor, when receiving the initial data set, is further to:
receive the initial data set based on registering for the group network.

13. A non-transitory computer-readable medium storing instructions, the instructions comprising:
one or more instructions which, when executed by at least one processor, cause the at least one processor to:
receive, from a server device, an initial data set,
the initial data set including a first version identifier;
monitor heartbeat messages received from the server device;
determine, based on monitoring the heartbeat messages, a number of missed heartbeat messages;
determine if the number of missed heartbeat messages exceeds a threshold value;
determine, when the number of missed heartbeat messages does not exceed the threshold value, if at least one of the heartbeat messages includes a second version identifier,
the first version identifier being different than the second version identifier;
receive, when the at least one of the heartbeat messages does not include a second version identifier, an updated data set,
the updated data set including an updated version identifier;
determine, when the updated version identifier is newer than the first version identifier, if the updated version identifier is a particular increment higher than the first version identifier;
discard, when the updated version identifier is not newer than the first version identifier, the updated data set; and
transmit, when the updated data set is different than the initial data set, a registration request to the server device.

14. The non-transitory computer-readable medium of claim 13, where the instructions further comprise:
one or more instructions to process, when the updated version identifier is the particular increment higher than the first version identifier, the updated data set.

15. The non-transitory computer-readable medium of claim 13, where the instructions further comprise:
one or more instructions to transmit, when the updated version identifier is not the particular increment higher than the first version identifier, another registration request to the server device.

16. The non-transitory computer-readable medium of claim 13, where the instructions further comprise:
one or more instructions to transmit another registration request to the server device when at least one of:
the number of missed heartbeat messages exceeds the threshold value, or
the at least one of the heartbeat messages includes the second version identifier.

17. The method of claim 1, where the particular increment is a single increment.

18. The method of claim 1, further comprising:
registering, with the server device, for a group network,
where, when receiving the initial data set, the method includes:
receiving the initial data set based on registering for the group network.

19. The non-transitory computer-readable medium of claim 13, where the particular increment is a single increment.

20. The non-transitory computer-readable medium of claim 13, where the instructions further comprise:
one or more instructions to register, with the server device, for a group network,
where the one or more instructions to receive the initial data set include:
one or more instructions to receive the initial data set based on registering for the group network.

* * * * *